(12) United States Patent
Lu

(10) Patent No.: US 11,409,984 B2
(45) Date of Patent: Aug. 9, 2022

(54) SYSTEMS AND METHODS FOR IMAGE SEARCHING

(71) Applicant: ZHEJIANG DAHUA TECHNOLOGY CO., LTD., Zhejiang (CN)

(72) Inventor: Chengxiang Lu, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 9 days.

(21) Appl. No.: 17/089,737

(22) Filed: Nov. 5, 2020

(65) Prior Publication Data

US 2021/0049406 A1 Feb. 18, 2021

Related U.S. Application Data

(63) Continuation of application No. PCT/CN2019/085630, filed on May 6, 2019.

(30) Foreign Application Priority Data

May 7, 2018 (CN) .......................... 201810425927.8

(51) Int. Cl.
*G06K 9/00* (2022.01)
*G06K 9/62* (2022.01)
(Continued)

(52) U.S. Cl.
CPC ........... *G06K 9/6215* (2013.01); *G06F 16/56* (2019.01); *G06K 9/623* (2013.01); *G06V 10/25* (2022.01)

(58) Field of Classification Search
CPC .............. G06F 16/5866; G06F 16/906; G06K 2209/05; G06K 9/6256; G06K 9/4671;
(Continued)

(56) References Cited

U.S. PATENT DOCUMENTS

| 5,644,765 A * | 7/1997 | Shimura ............. G06F 16/5838 |
| 2007/0122063 A1* | 5/2007 | Baba .................... G06F 16/5838 382/305 |

FOREIGN PATENT DOCUMENTS

| CA | 3031548 A1 | 1/2018 |
| CN | 101526944 A | 9/2009 |

(Continued)

OTHER PUBLICATIONS

Yuan Luo, Cai-ming Wub, Yi Zhang, Facial expression recognition based on fusion feature of PCA and LBP with SVM, 2013, Elsevier (Year: 2013).*

(Continued)

*Primary Examiner* — Alex Kok S Liew
(74) *Attorney, Agent, or Firm* — Metis IP LLC

(57) ABSTRACT

A system and a method for image searching. The method may include obtaining a target image and a plurality of images, wherein at least one similar image to the target image is to be searched from the plurality of images. The method may include determining a target feature vector of the target image and a feature vector of each of the plurality of images, each of the target feature vector and the feature vectors being an N-dimensional feature vector in an N-dimensional feature space. The method may include determining a search region in the N-dimensional feature space. The method may include determining one or more candidate images, the feature vector of each candidate image being within the search region. The method may further include determining the at least one similar image to the target image among the one or more candidate images.

18 Claims, 8 Drawing Sheets

(51) Int. Cl.
   *G06F 16/56* (2019.01)
   *G06V 10/25* (2022.01)
(58) Field of Classification Search
   CPC .. G06K 9/6215; G06K 9/6219; G06K 9/6227; G06K 9/6254; G06K 9/3233; G06K 9/4609; G06K 9/623; G06K 9/6232
   See application file for complete search history.

(56) References Cited

FOREIGN PATENT DOCUMENTS

| | | | |
|---|---|---|---|
| CN | 102436491 | A | 5/2012 |
| CN | 106055576 | A | 10/2016 |
| CN | 107194424 | A | 9/2017 |
| CN | 107247730 | A | 10/2017 |
| CN | 107291855 | A | 10/2017 |
| CN | 107766492 | A | 3/2018 |
| EP | 1204032 | A1 | 5/2002 |
| EP | 3300002 | A1 | 3/2018 |
| WO | 2019214565 | A1 | 11/2019 |

OTHER PUBLICATIONS

International Search Report in PCT/CN2019/085630 dated Jul. 25, 2019, 4 pages.
Written Opinion in PCT/CN2019/085630 dated Jul. 25, 2019, 5 pages.
Wang, Jian et al., Granular Computing and Image Matching Technology Improvements, Computer Knowledge and Technology, 9(33): 7571-7574, 2013.
Wendy Chang et al., Data Resource Selection in Distributed Visual Information Systems, IEEE, 10(6): 1-31, 1998.
Remco C. Veltkamp et al., Content-Based Image Retrieval Systems: A Survey, Department of Computing Science, Utrecht University, 2000, 49 pages.
The Extended European Search Report in European Application No. 19799936.0 dated Apr. 30, 2021, 7 pages.

* cited by examiner

600B

| Determining a geometrical distance range in an N-dimensional feature space corresponding to the preset similarity range, the geometrical distance range being defined by a shortest geometrical distance and a longest geometrical distance | 612 |

↓

| In each dimension, determining, based on the shortest geometrical distance and the target feature value in the dimension, a first coordinate range, a difference between the target feature value in the dimension and each value in the first coordinate range being equal to or smaller than the shortest geometrical distance | 614 |

↓

| In each dimension, determining, based on the longest geometrical distance and the target feature value in the dimension, a second coordinate range, a difference between the target feature value in the dimension and each value in the second coordinate range being equal to or smaller than the longest geometrical distance | 616 |

↓

| Determining, a first region defined by the first coordinate ranges in the N-dimensional feature space and a second region defined by the second coordinate ranges in the N-dimensional feature space | 618 |

↓

| Determining a region in the second region excluding the first region as the search region | 620 |

FIG. 6B

SYSTEMS AND METHODS FOR IMAGE SEARCHING

CROSS-REFERENCE TO RELATED APPLICATIONS

This application is a continuation of International Patent Application No. PCT/CN2019/085630, filed on May 6, 2019, which claims priority of Chinese Patent Application No. 201810425927.8, filed on May 7, 2018, the contents of each of which are hereby incorporated by reference.

TECHNICAL FIELD

The present disclosure generally relates to image searching, and more particularly, relates to systems and methods for searching a similar image to a target image.

BACKGROUND

Image searching has become more difficult with the increase in the number of digital images. Conventionally, an image search engine (e.g., a Google image search engine, a Baidu image search engine) often performs image searching based on textual meta-information of a set of images to be searched, such as a keyword and an image tag labelled on an image in the set. However, image searching based on textual meta-information may have limited accuracy because it is difficult to describe an image clearly using a keyword or tag. Besides, it is likely that different people may assign different keywords or labels on a same image, which may lead to an inaccurate search result. Further, a portion of the images in the set may have little or no textual meta-information, which may also affect the searching accuracy. Another approach for searching a similar image to a target image from the set is based on feature vectors of the target image and the images in the set. The degree of similarity between the target image and an image in the set may be determined by comparing the feature vector of the target image and the feature vector of the image. The efficiency of the approach based on the feature vectors may be reduced if the count of the images in the set is too large (e.g., greater than a threshold). Therefore, it may be desirable to develop systems and methods for image searching with improved accuracy and/or efficiency.

SUMMARY

According to an aspect of the present disclosure, a system is provided. The system may include at least one storage medium including a set of instructions, and at least one processor in communication with the at least one storage medium. When executing the set of instructions, the at least one processor may be directed to cause the system to obtain a target image and a plurality of images. At least one similar image to the target image may be searched from the plurality of images. The at least one processor may be directed to cause the system to determine a target feature vector of the target image and a feature vector of each of the plurality of images. Each of the target feature vector and the feature vectors may be an N-dimensional feature vector in an N-dimensional feature space. The at least one processor may be directed to cause the system to determine a search region in the N-dimensional feature space based on the target feature vector and a preset similarity range between the at least one similar image and the target image. The at least one processor may be directed to cause the system to determine one or more candidate images among the plurality of images. The feature vector of each candidate image may be within the search region. The at least one processor may be directed to cause the system to determine the at least one similar image to the target image among the one or more candidate images based on the preset similarity range, the target feature vector, and the one or more feature vectors of the one or more candidate images.

In some embodiments, to determine the at least one similar image to the target image among the one or more candidate images, the at least one processor may be directed to cause the system to determine a similarity degree between the target image and each of the one or more candidate images. The at least one processor may be directed to cause the system to select at least one candidate image among the one or more candidate images. The similarity degree of each selected candidate image may be within the preset similarity range. The at least one processor may be directed to cause the system to designate the at least one selected candidate image as the at least one similar image to the target image.

In some embodiments, the at least one processor may be directed to cause the system to rank the plurality of similar images according to the similarity degree between each similar image and the target image in a descending order to generate a first ranking result. The at least one processor may be directed to cause the system to transmit a display list including at least a portion of the plurality of similar images to a terminal device. The at least a portion of the plurality of similar images may be ranked according to the first ranking result in the display list.

In some embodiments, the target feature vector may include a target feature value in each dimension in the N-dimensional feature space.

In some embodiments, to determine the search region in the N-dimensional feature space, the at least one processor may be directed to cause the system to determine a geometrical distance range in the N-dimensional feature space corresponding to the preset similarity range. The at least one processor may be directed to cause the system to determine a coordinate range of the at least one similar image in each dimension. A difference between the target feature value in the dimension and each value in the coordinate range may be within the geometrical distance range. The at least one processor may be further directed to cause the system to determine the search region based on the coordinate range in each dimension.

In some embodiments, to determine the search region in the N-dimensional feature space, the at least one processor may be directed to cause the system to determine a geometrical distance range in the N-dimensional feature space corresponding to the preset similarity range. The geometrical distance range may be defined by a shortest geometrical distance and a longest geometrical distance. In each dimension, the at least one processor may also be directed to cause the system to determine a first coordinate range based on the shortest geometrical distance and the target feature value in the dimension. A difference between the target feature value in the dimension and each value in the first coordinate range may be smaller than the shortest geometrical distance. In each dimension, the at least one processor may be directed to cause the system to determine a second coordinate range based on the longest geometrical distance and the target feature value in the dimension. A difference between the target feature value in the dimension and each value in the second coordinate range may be smaller than the longest geometrical distance. The at least one processor may be further directed to cause the system to determine a first region defined by the first coordinate ranges in the N-dimensional feature space and a second region defined by the second coordinate ranges in the N-dimensional feature space. The at least one processor may be directed to cause the system to determine a region in the second region excluding the first region as the search region.

In some embodiments, to determine the search region in the N-dimensional feature space, the at least one processor may be directed to cause the system to divide the preset similarity range into a plurality of sub-ranges. For each of the plurality of sub-ranges, the at least one processor may be directed to cause the system to determine a sub-search region corresponding to the sub-range in the N-dimensional feature space based on the target feature vector. The search region may include plurality of sub-search regions corresponding to the plurality of sub-ranges.

In some embodiments, to determine the one or more candidate images among the plurality of images, the at least one processor may be directed to cause the system to determine one or more first candidate images among the plurality of images for each of the plurality of sub-search regions, wherein the feature vector of each first candidate image may be within the corresponding sub-search region. The one or more candidate images may include the one or more first candidate images corresponding to each sub-search region.

In some embodiments, to determine the at least one similar image to the target image among the one or more candidate images, for each of the plurality of sub-search regions, the at least one processor may be directed to cause the system to determine or obtain a similarity degree between the target image and each first candidate image corresponding to the sub-search region. For each of the plurality of sub-search regions, the at least one processor may be directed to cause the system to select one or more first candidate images among the one or more first candidate images corresponding to the sub-search region. The similar degree between each selected first candidate image and the target image may be within the corresponding sub-range. For each of the plurality of sub-search regions, the at least one processor may be directed to cause the system to designate the one or more selected first candidate images as one or more similar images of the at least one similar image to the target image.

In some embodiments, to determine the sub-search region in the N-dimensional feature space for each of the plurality of sub-ranges, the at least one processor may be directed to cause the system to rank the plurality of sub-ranges to generate a second ranking result. The at least one processor may be directed to cause the system to sequentially determine the sub-search region for each of the plurality of sub-ranges according to the second ranking result.

In some embodiments, to determine the one or more candidate images among the plurality of images, the at least one processor may be directed to cause the system to store the feature vectors of the plurality of images into a table. The table may include a plurality of rows and N columns, each row representing an image of the plurality of images, and each column representing a dimension in the N-dimensional feature space. The at least one processor may be directed to cause the system to create an index for each of the N columns of the table. The at least one processor may be directed to cause the system to select the one or more candidate images among the plurality of images based on the search region and the indexes of the table. The feature vector of each candidate image may be within the search region.

According to another aspect of the present disclosure, a method is provided. The method may be implemented on a device having at least one storage medium including a set of instructions, and at least one processor in communication with the at least one storage medium. The method may include obtaining a target image and a plurality of images. At least one similar image to the target image may be to be searched from the plurality of images. The method may include determining a target feature vector of the target image and a feature vector of each of the plurality of images. Each of the target feature vector and the feature vectors may be an N-dimensional feature vector in an N-dimensional feature space. The method may also include determining a search region in the N-dimensional feature space based on the target feature vector and a preset similarity range between the at least one similar image and the target image. The method may include determining one or more candidate images among the plurality of images. The feature vector of each candidate image may be within the search region. The method may further include determining the at least one similar image to the target image among the one or more candidate images based on the preset similarity range, the target feature vector, and the one or more feature vectors of the one or more candidate images.

According to another aspect of the present disclosure, a non-transitory computer readable medium is provided. The non-transitory computer readable medium may comprise at least one set of instructions for image searching, wherein when executed by at least one processor of a system, the at least one set of instructions may direct the system to obtain a target image and a plurality of images. At least one similar image to the target image may be to be searched from the plurality of images. The at least one set of instructions may direct the system to determine a target feature vector of the target image and a feature vector of each of the plurality of images. Each of the target feature vector and the feature vectors may be an N-dimensional feature vector in an N-dimensional feature space. The at least one set of instructions may direct the system to determine a search region in the N-dimensional feature space based on the target feature vector and a preset similarity range between the at least one similar image and the target image. The at least one set of instructions may direct the system to determine one or more candidate images among the plurality of images. The feature vector of each candidate image may be within the search region. The at least one set of instructions may direct the system to determine the at least one similar image to the target image, among the one or more candidate images, based on the preset similarity range, the target feature vector, and the one or more feature vectors of the one or more candidate images.

According to still another aspect of the present disclosure, a system for image searching is provided. The system may include an obtaining module, a feature vector determination module, a search region determination module, a candidate image determination module, and a similar image determination module. The obtaining module may be configured to obtain a target image and a plurality of images, wherein at least one similar image to the target image is to be searched from the plurality of images. The feature vector determination module may be configured to determine a target feature vector of the target image and a feature vector of each of the plurality of images, each of the target feature vector and the feature vectors being an N-dimensional feature vector in an N-dimensional feature space. The search region determination module may be configured to determine a search region in the N-dimensional feature space based on the target feature vector and a preset similarity range between the at least one similar image and the target image. The candidate image determination module may be configured to determine one or more candidate images among the plurality of images, wherein the feature vector of each candidate image is within the search region. The similar image determination module may be configured to determine the at least one similar image to the target image among the one or more candidate images based on the preset similarity range, the target feature vector, and the one or more feature vectors of the one or more candidate images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6B is a flowchart illustrating an exemplary process for determining a search region according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Figure 2:
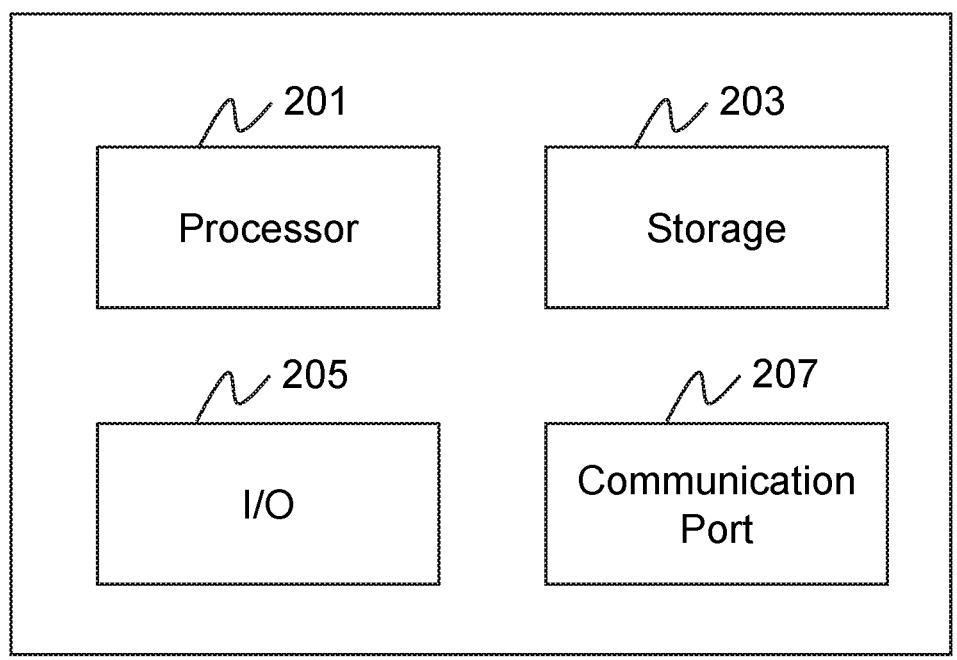
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 201 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to systems and methods for image searching. The systems and methods may obtain a target image and a plurality of images, wherein at least one similar image to the target image is to be searched from the plurality of images. The systems and methods may determine a target feature vector of the target image and a feature vector of each of the images, each of the target feature vector and the feature vectors being an N-dimensional feature vector in an N-dimensional feature space. The systems and methods may also determine a search region in the N-dimensional feature space based on the target feature vector and a preset similarity range between the at least one similar image and the target image. The systems and methods may further determine one or more candidate images among the plurality of images, wherein the feature vector of each candidate image is within the search region. The systems and methods may further select the at least one similar image to the target image from the one or more candidate images based on the preset similarity range, the target feature vector, and the one or more feature vectors of the one or more candidate images.

According to some embodiments of the present disclosure, at least one similar image to a target image may be search from a set of images based on a target feature vector of the target image and a feature vector of each image in the set. A search region in the N-dimensional feature space may be determined based on the preset similarity range. An image in the set whose feature vector is within the search region may be determined as a candidate image for further analysis, while an image in the set whose feature vector is outside the search region may be omitted from further analysis. This may reduce computational amount and improve searching efficiency. In addition, in some embodiments, the preset similarity range may be divided into a plurality of sub-ranges. The systems and methods may process the sub-ranges in parallel or in sequence to determine one or more similar images that satisfies each sub-range. This may further improve searching efficiency.

Figure 1:
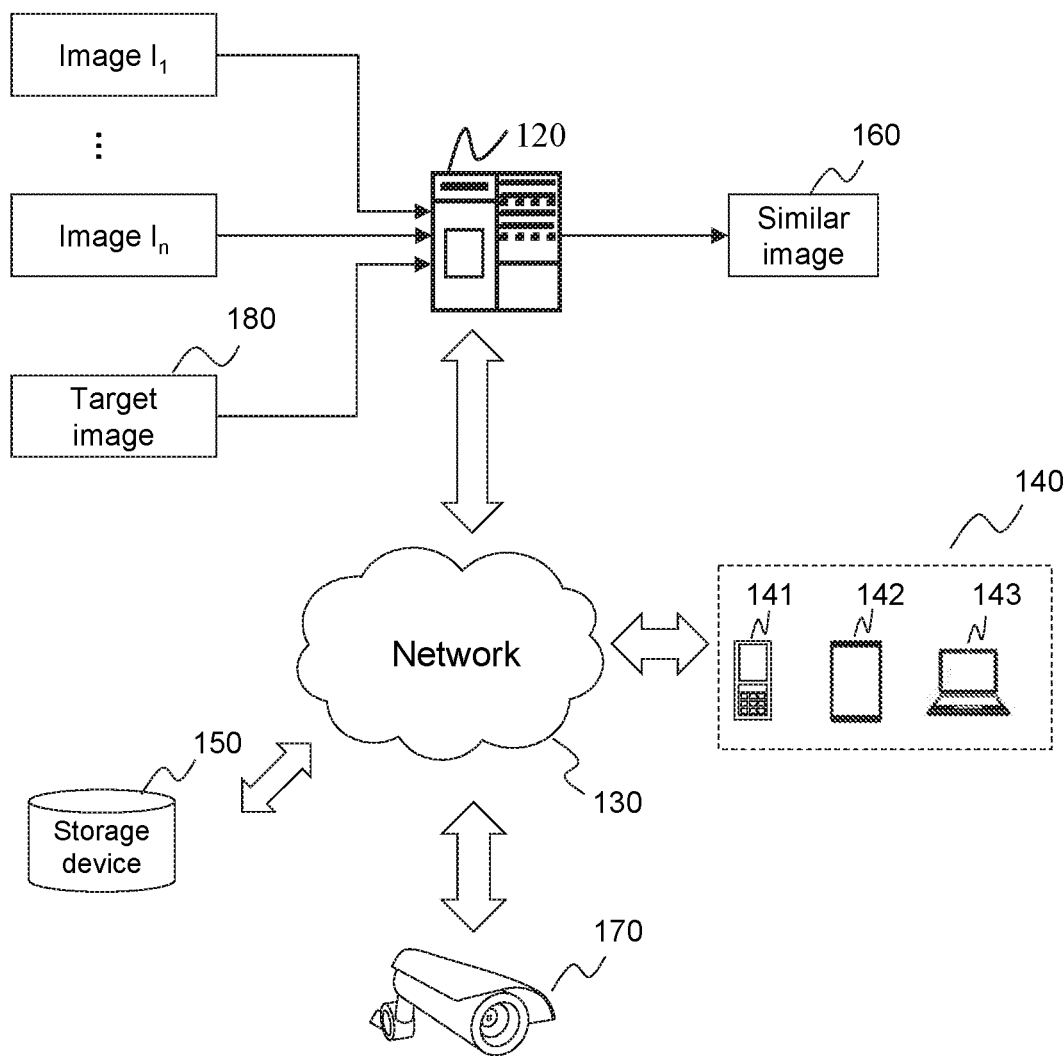
FIG. 1 is a schematic diagram illustrating an exemplary image searching system according to some embodiments of the present disclosure.

FIG. 1 is a schematic diagram illustrating an exemplary image searching system 100 according to some embodiments of the present disclosure. As shown in FIG. 1, the image searching system 100 may include a processing device 120, a network 130, a terminal device 140, a storage device 150, and an image acquisition device 170.

The processing device 120 may be process information and/or data relating to the image searching system 100 to perform one or more functions described in the present disclosure. For example, the processing device 120 obtain a target image 180 and an image set including an image $I_1$, an image $I_2$, . . . , and an image $I_n$ as shown in FIG. 1. The target image 180 and/or the image set may be obtained from an external source and/or one or more components of the image searching system 100, such as the terminal device 140, the storage device 150, and/or an image acquisition device 170. The processing device 120 may further search one or more similar images 160 that are similar to the target image 180 from the image set.

In some embodiments, the processing device 120 may be a single server or a server group. The server group may be centralized or distributed. In some embodiments, the processing device 120 may be local to or remote from the image searching system 100. For example, the processing device 120 may access information and/or data from the terminal device 140, the storage device 150, and/or the image acquisition device 170 via the network 130. As another example, the processing device 120 may be directly connected to the terminal device 140, the storage device 150, and/or the image acquisition device 170 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be implemented by a computing device 200 having one or more components as described in connection with FIG. 2.

In some embodiments, the processing device 120 may include one or more processors (e.g., single-core processor(s) or multi-core processor(s)) to perform operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof. For example, the processing device 120 may include a microprocessor to process a video/image captured by the image acquisition device 170.

The network 130 may include any suitable network that can facilitate the exchange of information and/or data for the image searching system 100. In some embodiments, one or more components of the image searching system 100 (e.g., the processing device 120, the storage device 150, the terminal device 140) may communicate information and/or data with one or more other components of the image searching system 100 via the network 130. For example, the processing device 120 may obtain images from the storage device 150 via the network 130. As another example, the processing device 120 may obtain user instruction(s) from the terminal device 140 via the network 130.

The network 130 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 130 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 130 may include one or more network access points. For example, the network 130 may include wired and/or wireless network access points such as base stations and/or internet exchange points through which one or more components of the image searching system 100 may be connected to the network 130 to exchange data and/or information.

The terminal device 140 may enable a user interaction between a user and one or more components of the image searching system 100, such as the processing device 120 and/or the storage device 150. For example, the user may input a search request to search similar images to the target image 180 via the terminal device 140. Additionally or alternatively, the terminal device 140 may display the one or more similar images 160 of the target image 180 to the user. In some embodiments, the terminal device 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal device 140 may include an input device, an output device, etc. In some embodiments, the terminal device 140 may be part of the processing device 120.

The storage device 150 may store data, instructions, and/or any other information. In some embodiments, the storage device 150 may store data obtained from the processing device 120, the terminal device 140, and/or image acquisition device 170. In some embodiments, the storage device 150 may store data and/or instructions that the processing device 120 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 130 to communicate with one or more other components of the image searching system 100 (e.g., the processing device 120, the terminal device 140). One or more components of the image searching system 100 may access the data or instructions stored in the storage device 150 via the network 130. In some embodiments, the storage device 150 may be part of the processing device 120.

The image acquisition device 170 may be and/or include any suitable device that is capable of acquiring image data. Exemplary image acquisition device 170 may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device 170 may include a gun camera, a dome camera, an integrated camera, a binocular camera, a monocular camera, etc. The image data acquired by the image acquisition device 170 may include an image, or any data about an image, such as values of one or more pixels (or referred to as pixel values) of an image (e.g., luma, gray values, intensities, chrominance, contrast of one or more pixels of an image), RGB data, audio information, timing information, location data, etc. In some embodiments, the image acquisition device 170 may include a charge-coupled device (CCD), a complementary metal-oxide-semiconductor (CMOS) sensor, an N-type metal-oxide-semiconductor (NMOS), a contact image sensor (CIS), and/or any other suitable image sensor.

It should be noted that the above description of the image searching system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the image searching system 100 may include one or more additional components. Additionally or alternatively, one or more components of the image searching system 100 described above, such as the terminal device 140 and/or the image acquisition device 170 may be omitted. As another example, two or more components of the image searching system 100 may be integrated into a single component.

FIG. 2 is a schematic diagram illustrating exemplary hardware and/or software components of an exemplary computing device 200 according to some embodiments of the present disclosure. The computing device 200 may be used to implement any component of the image searching system 100 as described herein. For example, the processing device 120 and/or the terminal device 140 may be implemented on the computing device 200, via its hardware, software program, firmware, or a combination thereof. Although only one such computing device is shown, for convenience, the computer functions relating to the image searching system 100 as described herein may be implemented in a distributed fashion on a number of similar platforms, to distribute the processing load.

As illustrated in FIG. 2, the computing device 200 may include a processor 201, a storage 203, an input/output (I/O) 205, and a communication port 207. The processor 201 may execute computer instructions (e.g., program code) and perform functions of the image searching system 100 in accordance with techniques as described elsewhere in the present disclosure. The computer instructions may include, for example, routines, programs, objects, components, data structures, procedures, modules, and functions, which perform particular functions as described elsewhere in the present disclosure. For example, the processor 201 may determine one or more similar images to a target image. In some embodiments, the processor 201 may include interface circuits and processing circuits therein. The interface circuits may be configured to receive electronic signals from the communication port 207, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the communication port 207.

In some embodiments, the processor 201 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor may be described in the computing device 200. However, it should be noted that the computing device 200 of the present disclosure may also include multiple processors, and thus operations and/or method steps that are performed by one processor as described in the present disclosure may also be jointly or separately performed by the multiple processors. For example, if in the present disclosure the processor of the computing device 200 executes both operations A and operation B, it should be understood that operation A and operation B may also be performed by two or more different processors jointly or separately in the computing device 200 (e.g., a first processor executes operation A and a second processor executes operation B, or vice versa, or the first and second processors jointly execute operations A and B).

The storage 203 may store data/information obtained from one or more components of the image searching system 100. In some embodiments, the storage 203 may include a mass storage device, a removable storage device, a volatile read-and-write memory, a read-only memory (ROM), or the like, or any combination thereof. For example, the mass storage device may include a magnetic disk, an optical disk, solid-state drives, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 203 may store one or more programs and/or instructions to perform exemplary methods described in the present disclosure. For example, the storage 203 may store a program for determining one or more similar images to a target image.

The I/O 205 may input and/or output signals, data, information, etc. In some embodiments, the I/O 205 may enable a user interaction with the computing device 200. In some embodiments, the I/O 205 may include or communicate with an input device and an output device to facilitate communication between the computing device 200 and an input device or an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 207 may be connected to a network (e.g., the network 130) to facilitate data communications. The communication port 207 may establish connections between the computing device 200 and one or more other components of the image searching system 100 or an external source. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 207 may be and/or include a standardized communication port, such as RS232, RS485, etc. In some embodiments, the communication port 207 may be a specially designed communication port.

Figure 3:
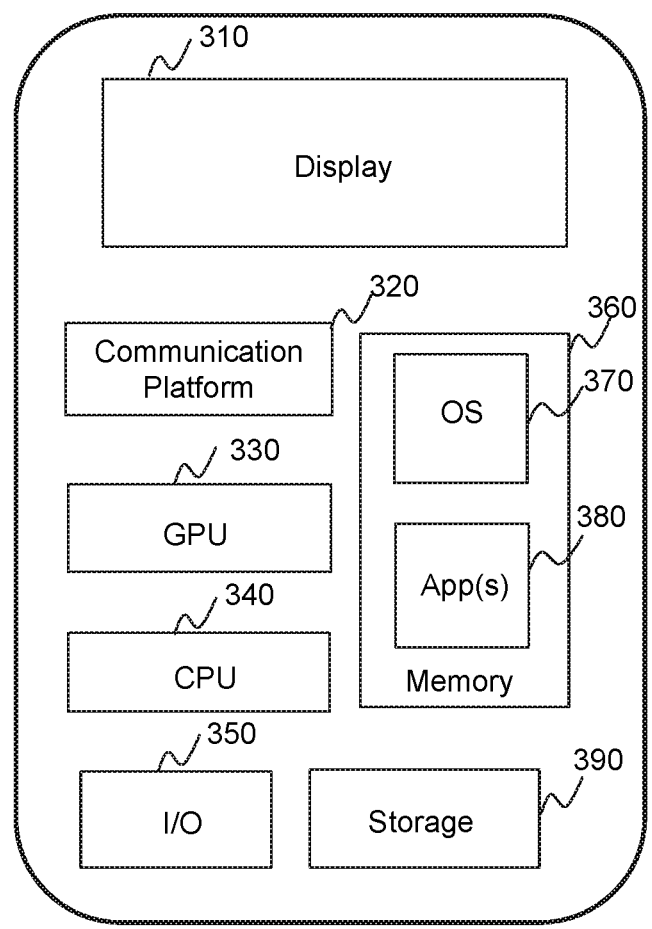
FIG. 3 is a schematic diagram illustrating exemplary components of a user terminal according to some embodiments of the present disclosure.

FIG. 3 is a schematic diagram illustrating exemplary components of an exemplary user terminal 300 according to some embodiments of the present disclosure. In some embodiments, one or more components (e.g., a terminal device 140) of the image searching system 100 may be implemented on the user terminal 300.

As illustrated in FIG. 3, the user terminal 300 may include a communication platform 320, a display 310, a graphics processing unit (GPU) 330, a central processing unit (CPU) 340, an I/O port 350, a memory 360, and a storage 390. In some embodiments, any other suitable component, including but not limited to a system bus or a controller (not shown), may also be included in the user terminal 300. In some embodiments, a mobile operating system 370 (e.g., iOS™, Android™, Windows Phone™) and one or more applications 380 may be loaded into the memory 360 from the storage 390 in order to be executed by the CPU 340.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
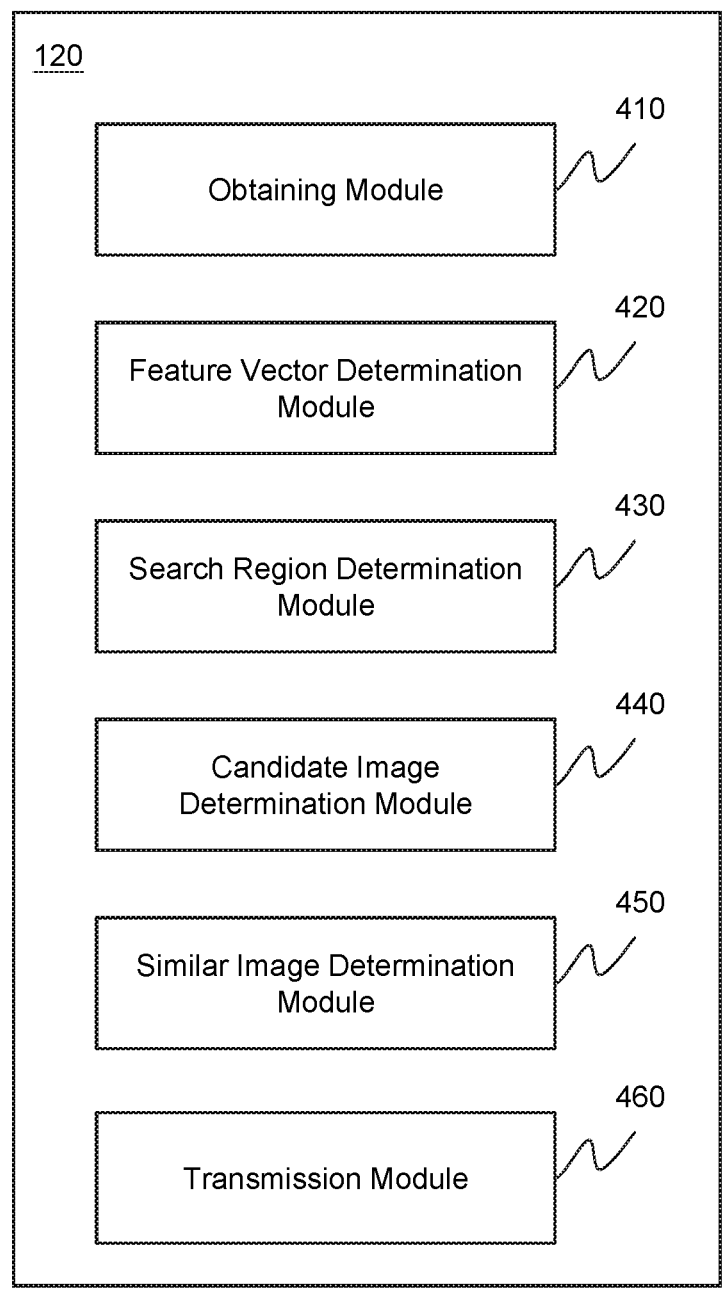
FIG. 4 is a block diagram of an exemplary processing device according to some embodiments of the present disclosure.

FIG. 4 is a block diagram of an exemplary processing device 120 according to some embodiments of the present disclosure. The processing device 120 may include an obtaining module 410, a feature vector determination module 420, a search region determination module 430, a candidate image determination module 440, a similar image determination module 450, and a transmission module 460.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The obtaining module 410 may obtain information and/or data related to the image searching system 100. For example, the obtaining module 410 may obtain a target image. The target image may be an image of any biological object (e.g., a human being, an animal, a plant) and/or a non-biological object (e.g., a vehicle, a building). Additionally or alternatively, the obtaining module 410 may obtain a plurality of images, wherein at least one similar image to the target image is to be searched from the plurality of images. In some embodiments, the obtaining module 410 may transmit the target image and/or the plurality of images to other modules of the processing device 120 for further processing. For example, the obtaining module 410 may transmit the target image and the plurality of images to the feature vector determination module 420 for determining a target feature vector of the target image and a feature vector of each of the plurality of images. As another example, the obtaining module 410 may transmit the target image to the search region determination module 430 for determining a search region in a N-dimensional feature space based on the target feature vector and a preset similarity range between at least one similar image and the target image. As still another example, the obtaining module 410 may transmit the plurality of images to the candidate image determination module 440 for determining one or more candidate images.

The feature vector determination module 420 may be configured to determine the target feature vector of the target image and the feature vector of each of the plurality of images. Each of the target feature vector and the feature vectors may be an N-dimensional feature vector in an N-dimensional feature space. N may have be any suitable positive integer. Details regarding the determination of the target feature vector and the feature vectors may be found elsewhere in the present disclosure (e.g., operation 504 and the relevant descriptions thereof).

The search region determination module 430 may be configured to determine the search region in the N-dimensional feature space. The search region may refer to a region in the N-dimensional feature space to be searched. In some embodiments, the search region may be a space defined by a coordinate range in each dimension of the N-dimensional feature space. For example, the search region determination module 430 may determine a coordinate range in each dimension based on the target feature vector and a preset similarity range between the at least one similar image and the target image. The preset similarity range may define a required range of a similarity degree between each similar image to be searched and the target image. Details regarding the determination of the search region may be found elsewhere in the present disclosure (e.g., operation 506 and the relevant descriptions thereof).

The candidate image determination module 440 may be configured to determine one or more candidate images among the plurality of images. The feature vector of each candidate image may be within the search region. In some embodiments, in order to facilitate the determination of the candidate image(s), the candidate image determination module 440 may generate an index of the plurality of images, and determine the candidate image(s) according to the index of the images. Details regarding the determination of the candidate image(s) may be found elsewhere in the present disclosure (e.g., operation 508 and the relevant descriptions thereof).

The similar image determination module 450 may be configured to determine the at least one similar image to the target image among the one or more candidate images based on the preset similarity range, the target feature vector, and the one or more feature vectors of the one or more candidate images. In some embodiments, the similar image determination module 450 may determine a candidate image as a similar image to the target image if the similarity degree between the candidate image and the target image is within the preset similarity range. Details regarding the determination of the at least one similar image may be found elsewhere in the present disclosure (e.g., operation 510 and the relevant descriptions thereof).

The transmission module 460 may be configured to transmit a display list including at least a portion of the at least one similar image to a terminal device (e.g., a terminal device 140) for display. In some embodiments, the at least one similar image may include a plurality of similar images to the target image. The display list may include at least a portion of the plurality of similar images. In some embodiments, the transmission module 460 may rank the plurality of similar images according to a similarity degrees between each similar image and the target image in a descending order to generate a first ranking result. The transmission module 460 may further generate a display list including at least a portion of the similar images, wherein the at least a portion of the similar images in the display list are ranked according to the first ranking result.

It should be noted that the above description of processing device 120 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. In some embodiments, one or more of the modules mentioned above may be omitted. For example, the transmission module 460 may be omitted. In some embodiments, two or more of the modules may be combined into a single module, and any one of the modules may be divided into two or more units. For example, the candidate image determination module 440 and the similar image determination module 450 may be integrated into a single module. In some embodiments, the processing device 120 may further include one or more additional modules, such as a division module configured to divide the search region into a plurality of sub-search regions.

Figure 5:
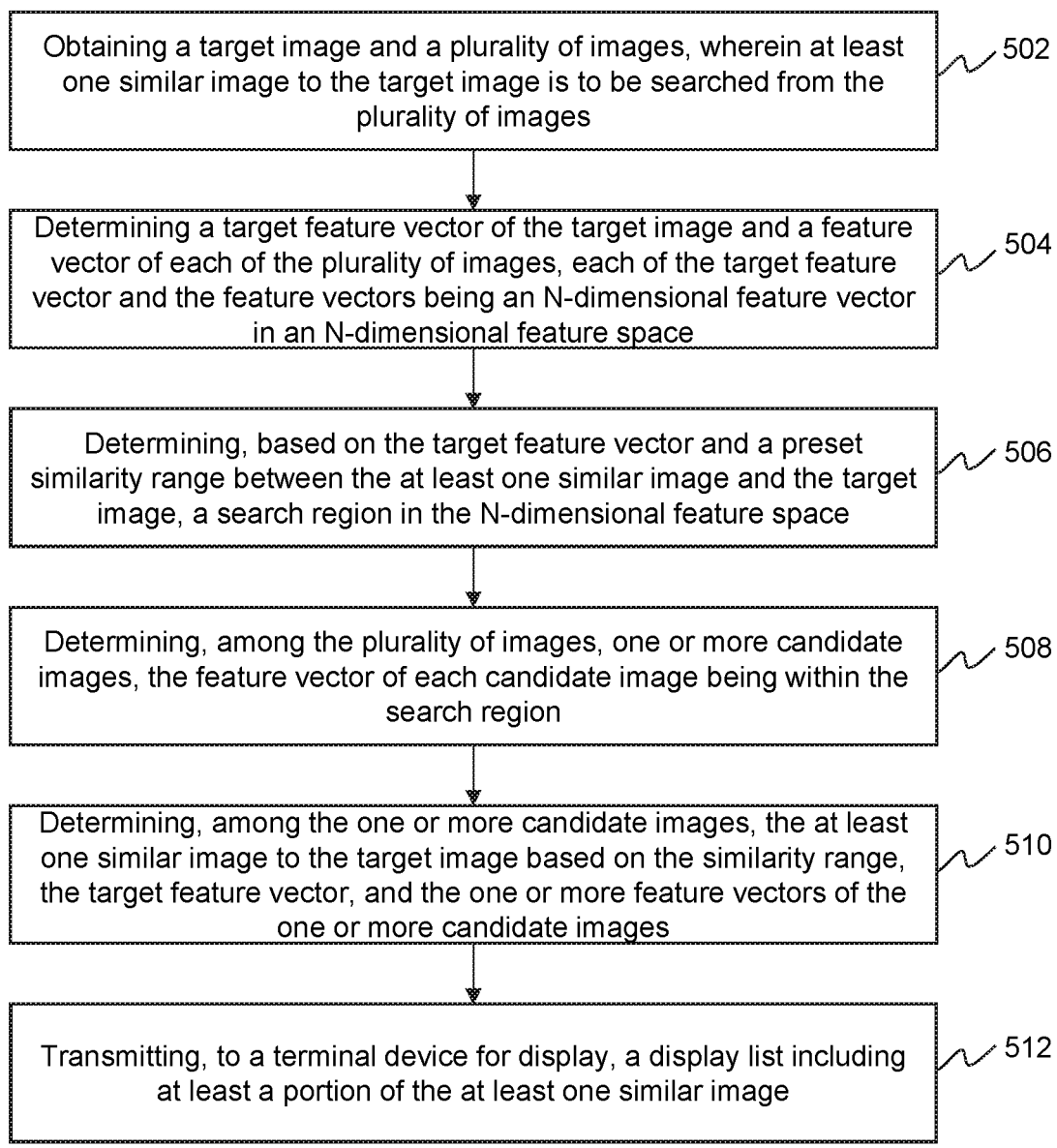
FIG. 5 is a flowchart illustrating an exemplary process for image searching according to some embodiments of the present disclosure.

FIG. 5 is a flow chart illustrating an exemplary process 500 for image searching according to some embodiments of the present disclosure. In some embodiments, the process 500 may be implemented on the image searching system 100 as illustrated in FIG. 1. For example, the process 500 may be stored in a storage medium (e.g., the storage device 150, or the storage 203 of the computing device 200) as a form of instructions, and invoked and/or executed by the processing device 120 (e.g., the processor 201 of the computing device 200, the CPU 340 of the mobile device 300, and/or one or more modules illustrated in FIG. 4).

In 502, the processing device 120 (e.g., the obtaining module 410) (e.g., the interface circuits of the processor 201) may obtain a target image and a plurality of images, wherein at least one similar image to the target image is to be searched from the plurality of images.

The target image may be a two-dimensional (2D) image, a three-dimensional (3D) image, a four-dimensional (4D), or any other type of image. The target image may be stored in any image format, such as a RAW format (e.g., unprocessed processed image data), a tagged input file format (TIFF), a joint photographic experts group format (JPEG), a graphics interchange format (GIF), or a bitmap format (BMP), or the like, or the combination thereof. The target image may be an image of any biological object (e.g., a human being, an animal, a plant) and/or a non-biological object (e.g., a vehicle, a building).

The plurality of images may include images from which the at least one similar image is to be searched. Similar to the target image, the images may be of any type and stored in any image format. The images may be images of any biological object and/or a non-biological object. Different images may have the same image type (or format) or different image types (or formats). In some embodiments, the images and the target image may be images of a same type of object, for example, both of the images and the target image are images of human beings. Alternatively, the images and the target image may be images of different types of objects.

In some embodiments, the target image and/or the images may be obtained from one or more components of the image searching system 100, such as the image acquisition device 170, a storage device (e.g., the storage device 150, the storage 203 of the computing device 200, the storage 390), the terminal device 140, or the like, or any combination thereof. For example, the target image may be obtained from the terminal device 140, and the images may be obtained from the storage device 150. Additionally or alternatively, the target image and/or the images may be obtained from an external source via a network (e.g., the network 130). For example, the processing device 120 may acquire the images from an external image database designated by a user.

In some embodiments, the processing device 120 may receive a search request to search the at least one similar image to the target image. In response to the search request, the processing device 120 may obtain the target image and the plurality of images. In some embodiments, the search request may be inputted by a user via a terminal device (e.g., the terminal device 140). The search request, including the target image, may be transmitted from the terminal device to the processing device 120 via a network (e.g., the network 130). Alternatively, the search request may be initiated by a computing device (e.g., the processing device 120) in certain conditions. For example, the computing device may designate an image to be processed as a target image and initiate a search request to search for similar images to the target image. As another example, the computing device may designate an image browsed by a user as a target image, and initiate a search request to search for similar images to the target image, wherein the similar images may be recommended to the user. In some embodiments, the search request may further include a searching range specifying the plurality of images to be searched, for example, a source, a type, a capture time, a captured location, or one or more other features of the plurality of images. The processing device 120 may obtain the images according to the searching range.

In 504, the processing device 120 (e.g., the feature vector determination module 420) (e.g., the processing circuits of the processor 201) may determine a target feature vector of the target image and a feature vector of each of the plurality of images.

Each of the target feature vector and the feature vectors may be an N-dimensional feature vector in an N-dimensional feature space. N may have be any suitable positive integer. Each dimension of the target feature vector may represent a feature of the target image and have a target feature value the target image in the dimension. For illustration purposes, the target feature vector is denoted as (A1, A2, . . . , An) herein, wherein A1 represents a target feature value of the target feature vector in an $i^{th}$ dimension. Each dimension of a feature vector of an image may represent a feature of the image and have a feature value of the image in the dimension. Exemplary features of an image or the target image may include a low-level feature, a high-level feature (e.g., a semantic feature), or a complicated feature (e.g., a deep hierarchical feature that is determined by a machine learning model), or the like, or any combination thereof. Exemplary low-level features may include a color-based feature (e.g., an RGB feature, a greyscale feature, etc.), a texture-based feature (e.g., a Local Binary Pattern (LBP) feature, etc.), a normalization-based feature (e.g., an illumination normalized feature, a color normalized feature, etc.), a gradient-based feature (e.g., a histogram of oriented gradients (HOG) feature, a gradient location and orientation histogram (GLOH) feature, etc.), or the like, or any combination thereof. In some embodiments, the high-level feature may be determined by analyzing the low-level feature using a machine learning model. The complicated features may be determined by analyzing the high-level features using a machine learning model.

In some embodiments, the N-dimensional feature space may be regarded as an N-dimensional coordinate system, and each dimension in the N-dimensional feature space may be regarded as a coordinate axis in the N-dimension coordinate system. An N-dimensional feature vector of an image may represent a point in the N-dimensional feature space (i.e., the N-dimensional coordinate system), wherein a feature value in each dimension may represent a coordinate value of the point along the corresponding coordinate axis. For example, an N-dimensional feature vector of an image A may represent a point A' in the N-dimensional feature space, wherein a feature value in the $i^{th}$ dimension may represent a coordinate value of the point A' in a corresponding $i^{th}$ dimensional coordinate axis.

In some embodiments, the processing device 120 may extract the target feature values of the target image by analyzing the target image, and construct the target feature vector using the target feature values. For each of the images, the processing device 120 may extract the feature values of the image by analyzing the image, and construct the corresponding feature vector using the corresponding feature values. In some embodiments, the processing device 120 may determine the target feature vector and the feature vectors based on a machine learning model. The machine learning model may be configured to receive an image and output a feature vector of the image by analyzing the inputted image. For example, the target image and the images may be inputted into the machine learning model, respectively, to generate a corresponding feature vector.

In some embodiments, the machine learning model may trained be in advance by a computing device (e.g., the processing device 120 or another processing device), and stored in a storage device (e.g., the storage device 150, the storage 203 of the computing device 200, the storage 390) of the image searching system 100 or an external source. The processing device 120 may obtain the machine learning model from the storage device or the external source via a network. In some embodiments, the machine learning model may be a convolutional neural network model (CNN), a fully convolutional neural network (FCN) model, a generative adversarial network (GAN), a back propagation (BP) neural network model, a radial basis function (RBF) neural network model, a deep belief nets (DBN) neural network model, an Elman neural network model, or any other type of model.

In 506, the processing device 120 (e.g., the search region determination module 430) (e.g., the processing circuits of the processor 201) may determine a search region in the N-dimensional feature space based on the target feature vector and a preset similarity range between the at least one similar image and the target image.

As used herein, the preset similarity range may define a required range of a similarity degree between each similar image to be searched and the target image. For example, the preset similarity range may define a minimum similarity degree (denoted as S1) and a maximum similarity degree (denoted as S2). For example, the preset similarity range may define that the similar degree between each similar image and the target image needs to be in a range of [60%, 100%] or (90%, 100%).

In some embodiments, the similarity degree between the target image and a certain image may be measured by a similarity degree between the target feature vector of the target image and a feature vector of the certain image. The similarity degree between the target feature vector and the feature vector of the certain image may be determined based on a similarity algorithm, include but be not limited to a Euclidean distance algorithm, a Manhattan distance algorithm, a Minkowski distance algorithm, a cosine similarity algorithm, a Jaccard similarity algorithm, a Pearson correlation algorithm, or the like, or any combination thereof. In some embodiments, the target feature vector and the feature vector may represent a target point and a point in the N-dimensional feature space, respectively. The similarity degree between the target feature vector and the feature vector may have a negative correlation with a geometrical distance between the target point and the point in the N-dimensional feature space. The geometrical distance between the target point and the point may refer to, for example, an Euclidean distance, a Manhattan distance, a Chebyshev distance, a Minkowski distance, a standardized Euclidean distance, a Mahalanobis distance, a cosine distance, or the like.

In some embodiments, the preset similarity range may be set by a user manually. For example, as described in connection with operation 502, a user may input a search request to search one or more similar images to the target image. The user may input an expected similarity range between the one or more similar images and the target image, wherein the expected similarity range may be included in the search request and transmitted to the processing device 120. The expected similarity range may be designated as the preset similarity range. Alternatively, the preset similarity range may be a default setting of the image searching system 100 or be determined by a computing device according to different situations. For example, the minimum similarity degree S1 of the preset similarity range may be increased if the count of the images to be searched is greater than a threshold. Alternatively, a portion of the preset similarity range (e.g., the minimum similarity degree S1) may be set by a user manual, and the other portion of the preset similarity range (e.g., the maximum similarity degree S2) may be a default setting of the image searching system 100 or be determined by the computing device according to different situations.

The search region may refer to a region in the N-dimensional feature space to be searched. In some embodiments, the search region may be a space defined by a coordinate range in each dimension of the N-dimensional feature space. For example, the processing device 120 may determine a coordinate range in each dimension based on the target feature vector and the preset similarity range. The processing device 120 may further determine the search region based on the coordinate ranges in the N dimensions. In some embodiments, the processing device 120 may perform one or more operations of process 600A as described in connection with FIG. 6A to determine the coordinate ranges and the search region. As another example, the preset similarity range may define a minimum similarity degree S1 and a maximum similarity degree S2 as described above. The processing device 120 may determine a first region corresponding to the maximum similarity degree S2 and a second region corresponding to the minimum similarity degree S1. The processing device 120 may further determine the search region based on the first region and the second region. In some embodiments, the processing device 120 may perform one or more operations of process 600B as described in connection with FIG. 6B to determine the first region, the second region, and the search region.

In some embodiments, the search region may include a plurality of sub-search regions in the N-dimensional feature space. For example, the processing device 120 may divide the preset similarity range into a plurality of sub-ranges. The processing device 120 may further determine a plurality of sub-search regions corresponding to the sub-ranges, wherein the sub-search regions may form the search region. In some embodiments, different sub-search regions may at least partially overlap with each other or not overlap at all in the N-dimensional feature space. Details regarding the determination of the sub-search regions may be found elsewhere in the present disclosure (e.g., operations 702 and 704 in FIG. 7 and the relevant descriptions thereof).

In 508, the processing device 120 (e.g., the candidate image determination module 440) (e.g., the processing circuits of the processor 201) may determine one or more candidate images among the plurality of images. The feature vector of each candidate image may be within the search region. As used herein, the feature vector of an image may be regarded as being within the search region if a feature value of the feature vector in each dimension is within the coordinate range of the search region in the dimension.

In some embodiments, in order to facilitate the determination of the candidate image(s), the processing device 120 may generate an index of the plurality of images, and determine the candidate image(s) according to the index of the images. For example, the processing device 120 may store the feature vectors of the images into a table. The table may include a plurality of rows and N columns, wherein each row represents an image of the images and each column represents a dimension in the N-dimensional feature space (i.e., a feature of an image). In some embodiments, the table may include one or more additional columns configured to store one or more other characteristics of the images (e.g., a storage path, an image format, etc.). In some embodiments, the table may be stored in a database, such as an Oracle database, a MySQL database, or the like, or the combination thereof.

The processing device 120 may further create an index for each of the N columns of the table. An index created for a column may be used in searching feature values in the corresponding dimension and improve search speed. Further, the processing device 120 may select the candidate image(s) among the images based on the search region and the indexes of the table. For example, the search region may define a coordinate range in each dimension as described above. The processing device 120 may retrieve the candidate image(s) from the table using an inquire statement (e.g., a "select" statement). The inquire statement may specify a value range in each column, which is equal to the coordinate range of the corresponding dimension.

For illustration purposes, the determination of the candidate image(s) based on an MySQL database is provided hereinafter as an example. It is assumed that the target feature vector of the target image and the feature vector of each image are in a 16-dimensional feature space. The target feature vector may be denoted as (a1, a2, a3, a4, a5, a6, a7, a8, a9, a10, a11, a12, a13, a14, a15, a16). The search region may be defined by a coordinate range in each of the 16 dimensions, i.e., [a1-d', a1-d) and (a1+d, a1+d'] on a first dimension, [a2-d', a2-d) and (a2+d, a2+d'] on a second dimension, , and [a16-d', a16-d) and (a16+d, a16+d] on a $16^{th}$ dimension. The processing device 120 may create a table to store the feature vectors of the images using a first SQL statement "CREATE TABLE Feature (x1 integer, x2 integer, x3 integer, x4 integer, x5 integer, x6 integer, x7 integer, x8 integer, x9 integer, x10 integer, x11 integer, x12 integer, x13 integer, x14 integer, x15 integer, x16 integer)". The processing device 120 may create an index for each column of the table using a second SQL statement " CREATE INDEX FeatureIndex on Feature(x1, x2, x3, x4, x5, x6, x7, x8, x9, x10, x11, x12, x13, x14, x15, x16)". The processing device 120 may retrieve one or more candidate images whose feature vectors are in the search region using a third SQL statement as below:

"select*from Feature (where $x1 >= a1 - d'$ and $x1 <$ $a1 - d$ and $x1 > a1 + d$ and $x1 <= a1 + d'$)

and ($x2 >= a2 - d'$ and $x2 < a2 - d$ or $x2 > a2 + d$ and $x2 <= a2 + d'$)

and ($x3 >= a3 - d'$ and $x1 < a3 - d$ or $x3 > a3 + d$ and $x3 <= a3 + d'$)

...

and ($x16 >= a16 - d'$ and $x16 <$ $a16 - d$ or $x16 > a16 + d$ and $x16 <= a16 + d'$)"

In some embodiments, as described in connection with operation 506, the search region may include a plurality of sub-search regions. The processing device 120 may determine one or more first candidate images for each sub-search region. The one or more first candidate images corresponding to each sub-search region may form the candidate images corresponding to the search region. Details regarding the determination of the one or more first candidate images corresponding to a sub-search region may be found elsewhere in the present disclosure (e.g., operation 706 in FIG. 7 and the relevant descriptions thereof).

In 510, the processing device 120 (e.g., the similar image determination module 450) (e.g., the processing circuits of the processor 201) may determine the at least one similar image to the target image among the one or more candidate images based on the preset similarity range, the target feature vector, and the one or more feature vectors of the one or more candidate images.

In some embodiments, the processing device 120 may determine a candidate image as a similar image to the target image if the similarity degree between the candidate image and the target image is within the preset similarity range. For example, the processing device 120 may determine a similarity degree between the target image and each candidate image. The similarity degree between the target image and a candidate image may be measured by a similarity degree between the target feature vector and a feature vector of the candidate image. Details regarding the similarity degree between the target image and a candidate image may be found elsewhere in the present disclosure (e.g., operation 506 and the relevant descriptions thereof). The processing device 120 may then select at least one candidate image among the one or more candidate images, wherein the similarity degree between each selected candidate image and the target image is within the preset similarity range. The processing device 120 may further designate the at least one selected candidate image as the at least one similar image to the target image.

In 512, the processing device 120 (e.g., the transmission module 460) (e.g., the interface circuits of the processor 201) may transmit a display list including at least a portion of the at least one similar image to a terminal device (e.g., a terminal device 140) for display.

In some embodiments, the terminal device may be associated with a user of the image searching system 100. For example, the terminal device may be associated with a user who initiates a search request to search the at least one similar image. In some embodiments, the at least one similar image may include a plurality of similar images to the target image. The display list may include at least a portion of the plurality of similar images. For example, the display list may include all or a portion of the similar images. The similar images in the display list may be ranked randomly or according to one or more ranking criterion (e.g., a capture time, a similarity degree to the target image, an image definition, an image size). For example, the processing device 120 may rank the similar images according to a similarity degrees between each similar image and the target image in a descending order to generate a first ranking result. The processing device 120 may further generate a display list including at least a portion of the similar images, wherein the at least a portion of the similar images in the display list are ranked according to the first ranking result. The at least a portion of the similar images may include all or a portion (e.g., top 3, top 10, top 20, etc.) of the similar images. The processing device 120 may further transmit the display list to the terminal device for display.

In some embodiments, after receiving the display list, the terminal device may display the display list according to a preference of a user associated with the terminal device. For example, the terminal device may display a certain number of similar images on an interface according to a user setting of the terminal device. Additionally or alternatively, the terminal device may receive a response regarding the display list from the user. For example, the user may click a similar image in the display list to enlarge the clicked similar image. As another example, the user may input a request to search one or more other similar images to the target image if he/she is not satisfied with the display list or needs to search more similar images.

It should be noted that the above description of process 500 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure.

In some embodiments, the process 500 may be accomplished with one or more additional operations not described, and/or without one or more of the operations discussed. For example, the process 500 may further include a storing operation, in which the processing device 120 may store the at least one similar image and/or an intermediate result in a storage device (e.g., the storage device 150, or the storage 203) disclosed elsewhere in the present disclosure. As another example, operation 512 may be omitted. Additionally, the order of the operations of the process 500 as illustrated in FIG. 5 and described above may not be intended to be limiting.

Figure 6A:
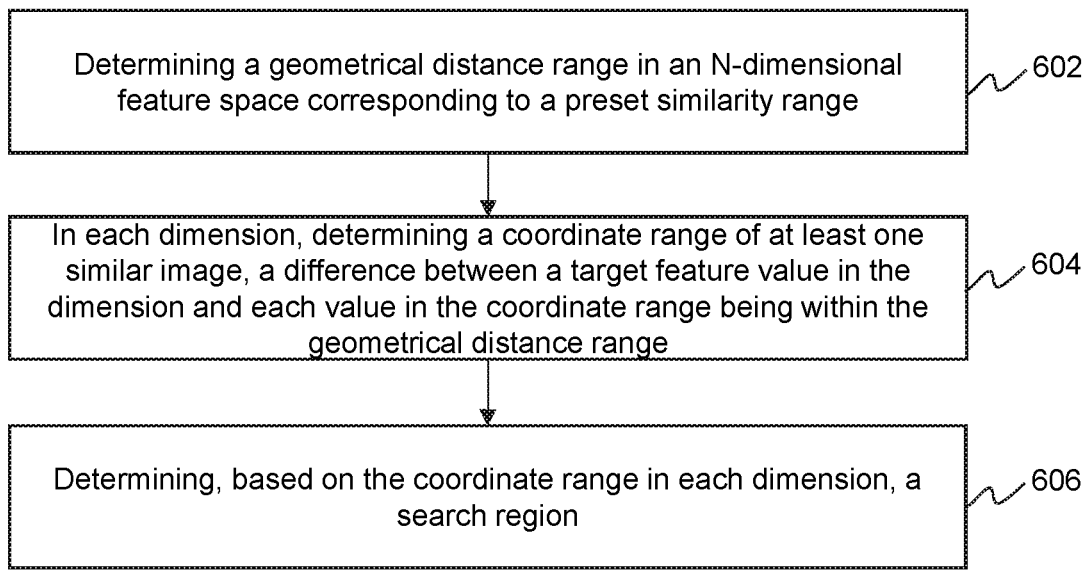
FIG. 6A is a flowchart illustrating an exemplary process for determining a search region according to some embodiments of the present disclosure.

FIG. 6A is a flow chart illustrating an exemplary process for determining a search region according to some embodiments of the present disclosure. In some embodiments, process 600A may be implemented on the image searching system 100 as illustrated in FIG. 1. For example, the process 600A may be stored in a storage medium (e.g., the storage device 150, or the storage 203) as a form of instructions, and invoked and/or executed by the processing device 120 (e.g., the processor 201 of the computing device 200, the CPU 340 of the mobile device 300, and/or one or more modules illustrated in FIG. 4). In some embodiments, one or more operations of the process 600A may be performed to achieve at least part of operation 506 as described in connection with FIG. 5.

In 602, the processing device 120 (e.g., the search region determination module 430) (e.g., the processing circuits of the processor 201) may determine a geometrical distance range in the N-dimensional feature space corresponding to the preset similarity range.

As described elsewhere in this disclosure (e.g., FIG. 5 and the relevant descriptions), the preset similarity range may define a minimum similarity degree S1 and a maximum similarity degree S2 between each similar image to be searched and the target image. The target feature vector of the target image may represent to a target point, and a feature vector of an image may represent a point in the N-dimensional feature space. The similarity degree between the target image and an image may have a negative correlation with a distance between the target point and the point corresponding to the image. The geometrical distance range may refer to a required range of a geometrical distance between the target point and a point corresponding to each similar image. In some embodiments, the geometrical distance range may include a shortest geometrical distance (denoted as D1) and a longest geometrical distance (denoted as D2). A point located at the longest geometrical distance D2 to the target point may represent an image that has the minimum similarity degree S1 with the target image. A point located at the shortest geometrical distance D1 to the target point may represent an image that has the maximum similarity degree S2 with the target image.

In some embodiments, the processing device 120 may determine the geometrical distance range by determining the longest geometrical distance D2 and/or the shortest geometrical distance D1. For example, the processing device 120 may determine the longest geometrical distance D2 based on the minimum similarity degree S1 and a relationship between geometrical distances in the N-dimensional feature space and similarity degrees. The relationship may be described in the form of a correlation function, or a table or a curve recording different similarity degrees and their corresponding geometrical distances. The processing device 120 may determine the longest geometrical distance D2 based on the minimum similarity degree S1 by solving the correlation function, looking up the table, or consulting the curve. Similarly, the processing device 120 may determine the shortest geometrical distance D1 based on the maximum similarity degree S2 and the relationship between geometrical distances in the N-dimensional feature space and similarity degrees. In some embodiments, a boundary value, such as the shortest geometrical distance D1 and/or the longest geometrical distance D2, may be included or excluded in the geometrical distance range.

In 604, in each dimension, the processing device 120 (e.g., the search region determination module 430) may determine a coordinate range of the at least one similar image in the dimension, wherein a difference between the target feature value of the target feature vector in the dimension and each value in the coordinate range is within the geometrical distance range.

As used herein, a coordinate range of the at least one similar image in a dimension may refer to a required range of a coordinate value of a feature vector of each similar image in the dimension. For example, the geometrical distance range corresponding to the preset similarity range may be denoted as [D1, D2], and the target feature vector in the N-dimensional feature space may be denoted as (A1, A2, . . . , An). The coordinate range of the at least one similar image in an $i^{th}$ dimension may be [Ai-D2, Ai-D1] or [Ai+D1, Ai+D2], wherein a difference between Ai (i.e., the target value in the $i^{th}$ dimension) and each value in the [Ai-D2, Ai-D1] or [Ai+D1, Ai+D2] is within [D1, D2].

In 606, the processing device 120 (e.g., the search region determination module 430) (e.g., the processing circuits of the processor 201) may determine a search region based on the coordinate range in each dimension. For example, the processing device 120 may determine a region formed by the coordinate range in each dimension as the search region. For example, the search region may be region including a plurality of points in the N-dimensional feature space. A coordinate of each point in the first dimension may be within the coordinate range in the first dimension (e.g., [A1-D2, A1-D1] or [A1+D1, A1+D2]), a coordinate of each point in the second dimension may be in the coordinate range in the second dimension (e.g., [A2-D2, A2-D1] or [A2+D1, A2+D2]), . . . , and a coordinate of each point in the Nth dimension may be in the coordinate range in the Nth dimension (e.g., [An-D2, An-D1] or [An+D1, An+D2]).

FIG. 6B is a flow chart illustrating an exemplary process for determining a search region according to some embodiments of the present disclosure. In some embodiments, process 600B may be implemented on the image searching system 100 as illustrated in FIG. 1. For example, the process 600B may be stored in a storage medium (e.g., the storage device 150, or the storage 203) as a form of instructions, and invoked and/or executed by the processing device 120 (e.g., the processor 201 of the computing device 200, the CPU 340 of the mobile device 300, and/or one or more modules illustrated in FIG. 4). The operations in the process 600B presented below are intended to be illustrative. In some embodiments, one or more operations of the process 600B may be performed to achieve at least part of operation 506 as described in connection with FIG. 5.

In 612, the processing device 120 (e.g., the search region determination module 430) may determine a geometrical distance range in the N-dimensional feature space corresponding to the preset similarity range. The geometrical distance range may be defined by a shortest geometrical distance D1 and a longest geometrical distance D2. More descriptions regarding the determination of the geometrical distance range may be found elsewhere in the present disclosure. See, e.g., operation 602 in FIG. 6 and relevant descriptions thereof.

In 614, in each dimension, the processing device 120 (e.g., the search region determination module 430) (e.g., the processing circuits of the processor 201) may determine a first coordinate range based on the shortest geometrical distance D1 and a target feature value in the dimension, wherein a difference between the target feature value in the dimension and each value in the first coordinate range may be equal to or smaller than the shortest geometrical distance D1. For example, the target feature value in an $i^{th}$ dimension may be Ai, and the first coordinate range in the $i^{th}$ dimension may be [Ai-D1, Ai+D1], wherein a difference between Ai and each value in [Ai-D1, Ai+D1] is equal to or smaller than D1. In some embodiments, the boundary values of the first coordinate range, such as Ai-D1 and/or Ai+D1, may be or may not be within the first coordinate range. For example, if D1 is within the geometrical distance range, the boundary values of the first coordinate range may be within the first coordinate range, and a difference between the target feature value in a dimension and each value in the first coordinate range in the dimension may be equal to or smaller than the shortest geometrical distance D1. As another example, if D1 is not within the geometrical distance range, the boundary values of the first coordinate range may not be within the first coordinate range, and a difference between the target feature value in a dimension and each value in the first coordinate range in the dimension may be smaller than the shortest geometrical distance D1.

In 616, in each dimension, the processing device 120 (e.g., the search region determination module 430) (e.g., the processing circuits of the processor 201) may determine a second coordinate range based on the longest geometrical distance D2 and the target feature value in the dimension, wherein a difference between the target feature value in the dimension and each value in the second coordinate range is equal to or smaller than the longest geometrical distance D2. For example, the target feature value in an ith dimension may be Ai, and the second coordinate range in the ith dimension may be [Ai-D2, Ai+D2], wherein a difference between Ai and each value in [Ai-D2, Ai+D2] is equal to or smaller than D2. Similar to the first coordinate range, the boundary values of the second coordinate range, such as Ai-D2 and Ai+D2, may be or may not be within the second coordinate range.

In 618, the processing device 120 (e.g., the search region determination module 430) (e.g., the processing circuits of the processor 201) may determine a first region defined by the first coordinate ranges in the N-dimensional feature space and a second region defined by the second coordinate ranges in the N-dimensional feature space.

In some embodiments, the processing device 120 may determine a region formed by the first coordinate range in each dimension as the first region. For example, the first region may be a region including a plurality of first points in the N-dimensional feature space. A coordinate of each first point in the first dimension may within the first coordinate range in the first dimension (e.g., [A1-D1, A1+D1]), a coordinate of each first point in the second dimension may be within the first coordinate range in the second dimension (e.g., [A2-D1, A2+D1], and a coordinate of each first point in the Nth dimension may be within the first coordinate range in the Nth dimension (e.g., [An-D1, An+D1]). In some embodiments, in each dimension, a difference between a coordinate value of a first point in the dimension and the target feature value in the dimension may be smaller than the minimum geometrical distance D1. It may suggest that a similarity degree between the target image and an image corresponding to the first point is greater than the maximum similarity degree S2, which is out of the preset similarity range.

Similarly, the processing device 120 may determine a region formed by the second coordinate range in each dimension in the N-dimensional feature space as the second region. For example, the second region may be a region in a plurality of second points in the N-dimensional feature space. A coordinate of each second point in the first dimension may within the second coordinate range in the first dimension (e.g., [A1-D2, A1+D2]), a coordinate of each second point in the second dimension may be within the second coordinate range in the second dimension (e.g., [A2-D2, A2+D2], and a coordinate of each second point in the Nth dimension may be within the second coordinate range in the Nth dimension (e.g., [An-D2, An+D2]).

For illustration purposes, it is assumed that the N-dimensional feature space is a 2-dimensional feature space formed by an X-axis and a Y-axis, first coordinate ranges in the X-axis and Y-axis are both [−1, 1], second coordinate ranges in the X-axis and Y-axis are both [−2, 2]. In such as case, a first region in the 2-dimensional feature space may be a square with four vertexes whose coordinates are (−1, −1), (−1, 1), (1, −1), and (1, 1). A second region in the 2-dimensional feature space may be a square with four vertexes whose coordinates are (−2, −2), (−2, 2), (2, −2), (2, 2).

In 620, the processing device 120 (e.g., the search region determination module 430) may determine a region in the second region excluding the first region as the search region. As described in connection with 618, a similarity degree between the target image and an image corresponding to a first point in the first region is out of the preset similarity range. Thus, the processing device 120 may exclude the first region from the search region.

In some embodiments, in each dimension, the processing device 120 may determine a coordinate range of the at least one similar image to be searched by subtracting the first coordinate range in the dimension from the second coordinate range in the dimension. For example, the coordinate range of the at least one similar image in the $i^{th}$ dimension may be determined by subtracting a first coordinate range [Ai-D1, Ai+D1] from a second coordinate range [Ai-D2, Ai+D2], which is equal to a coordinate range [Ai-D2, Ai-D1) and (Ai+D1, Ai+D2]. In some embodiments, the search region may include or exclude a boundary of the first region.

It should be noted that the above descriptions of the processes 600A and 600B are merely provided for the purposes of illustration, and not intended to be understood as the only embodiment. For persons having ordinary skills in the art, various variations and modifications may be conduct under the teaching of some embodiments of the present disclosure. In some embodiments, some operations may be reduced or added. However, those variations and modifications may not depart from the protecting of some embodiments of the present disclosure. In some embodiments, the process 600A and/or the process 600B may be accomplished with one or more additional operations not described, and/or without one or more of the operations discussed. Additionally, the order of the operations of the process 600A and/or the process 600B described above may not be intended to be limiting. For example, operations 614 and 616 may be performed simultaneously, or operation 616 may be performed before 614.

Figure 7:
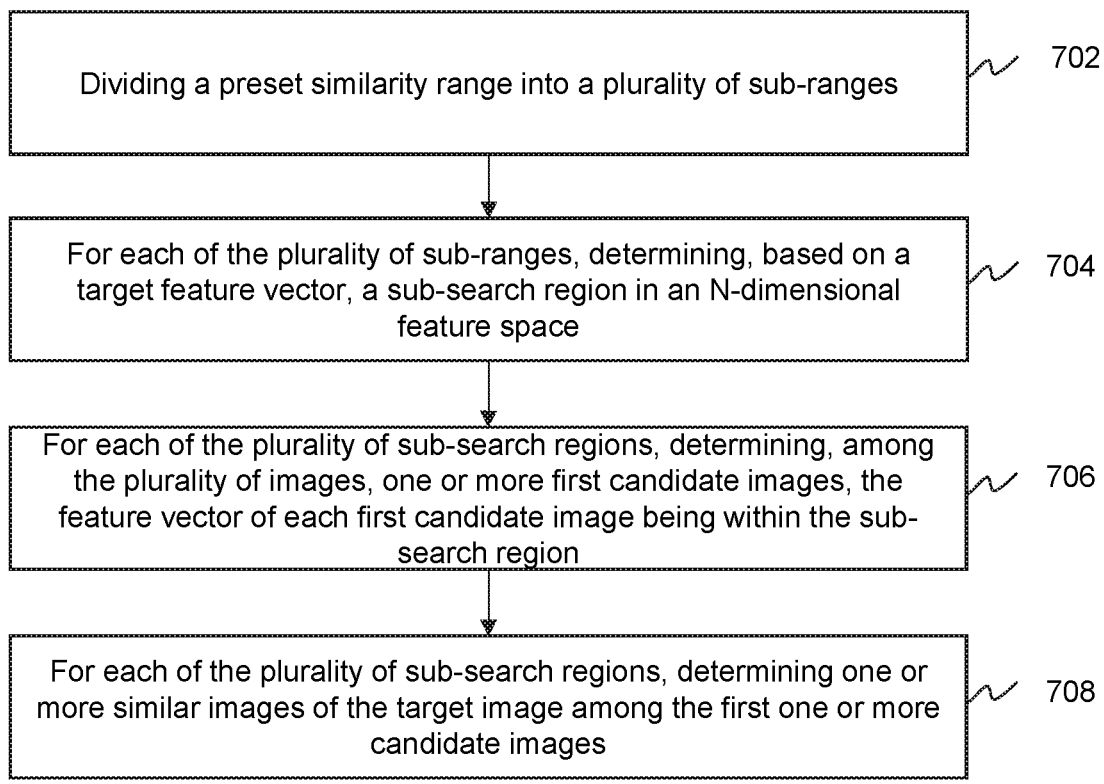
FIG. 7 is a flow chart illustrating an exemplary process for determining at least one similar image to a target image according to some embodiments of the present disclosure.

FIG. 7 is a flow chart illustrating an exemplary process for determining at least one similar image to a target image according to some embodiments of the present disclosure. In some embodiments, process 700 may be implemented on the image searching system 100 as illustrated in FIG. 1. For example, the process 700 may be stored in a storage medium (e.g., the storage device 150, or the storage 203) as a form of instructions, and invoked and/or executed by the processing device 120 (e.g., the processor 201 of the computing device 200, the CPU 340 of the mobile device 300, and/or one or more modules illustrated in FIG. 4). In some embodiments, one or more operations of the process 700 may be performed to achieve at least part of operations 506 to 510 as described in connection with FIG. 5.

In 702, the processing device 120 (e.g., the search region determination module 430) (e.g., the processing circuits of the processor 201) may divide a preset similarity range into a plurality of sub-ranges.

As described in connection with operation 506, the preset similarity range may define a required range of a similarity degree between each similar image to be searched and the target image. The preset similarity range may include a minimum similarity degree S1 and a maximum similarity degree S2. In some embodiments, the processing device 120 may divide the preset similarity range evenly into the sub-ranges having the same span. A span of a sub-range may refer to a similarity degree difference between the largest similarity degree in the sub-range and the smallest similarity degree in the sub-range. The span of each sub-range may be 1%, 3%, 5%, 7%, 10%, 20%, or any other suitable value. For example, a preset similarity range (60%, 100) may be evenly divided into 4 sub-ranges (i.e., (60%, 70%), (70%, 80%), (80%, 90%), and (99%, 100%)), each of which has a span of 10% similarity degrees.

As another example, a preset similarity range (60%, 100) may be evenly divided into 8 sub-ranges (i.e., (60%, 65%), (65%, 70%), (70%, 75%), (75%, 80%), (80%, 85%), (85%, 90%), (90%, 95%), (95%, 100%), each of which has a span of 5% similarity degree.

Alternatively, the processing device 120 may divide the preset similarity range unevenly into the sub-ranges having different spans. For example, a preset similarity range of (60%, 100%) may be unevenly divided into 4 sub-ranges having different spans, such as (60%, 80%), (80%, 90%), (90%, 95%), (95%, 100%).

In some embodiments, the division rule of the preset similarity range, such as the span of each sub-range and/or the number of the sub-ranges, may be a default setting of the image searching system 100 or be inputted by a user of the image searching system 100. Additionally or alternatively, the division rule may be determined by a computing device (e.g., the processing device 120) according to different situations. For example, the span of each sub-range may be determined by taking a required searching speed and/or a required searching time into consideration. In order to accelerate searching speed, the computing device may divide the preset similarity range evenly into more sub-ranges with a smaller span, wherein the sub-ranges may be processed in parallel or in sequence in image searching.

In 704, for each sub-range, the processing device 120 (e.g., the search region determination module 430) (e.g., the processing circuits of the processor 201) may determine a sub-search region in the N-dimensional feature space corresponding to the sub-range based on the target feature vector of the target image.

A sub-search region corresponding to a sub-range may be similar to a search region corresponding to the preset similarity range as described in connection with 506. The determination of a sub-search region corresponding to a sub-range may be performed in a similar manner with the determination of the search region corresponding to the preset similarity range as described in connection with operation 506, and the descriptions thereof are not repeated here.

In 706, for each sub-search region, the processing device 120 (e.g., the candidate image determination module 440) (e.g., the processing circuits of the processor 201) may determine one or more first candidate images among the plurality of images, wherein the feature vector of each first candidate image corresponding to the sub-search region is within the sub-search region.

In some embodiments, the determination of one or more first candidate images whose feature vectors are within a sub-search region may be performed in a similar manner with the determination of one or more candidate images whose feature vectors are within the search region described in connection with operation 508, and the descriptions thereof are not repeated here.

In 708, for each sub-search region, the processing device 120 (e.g., the similar image determination module 450) may determine one or more similar images to the target image among the one or more first candidate images corresponding to the sub-search region.

In some embodiments, for a sub-search region, the processing device 120 may determine or obtain a similarity degree between the target image and each first candidate image corresponding to the sub-search region. The processing device 120 may then select one or more first candidate images among the one or more first candidate images corresponding to the sub-search region, wherein a similar degree between each selected first candidate image and the target image is within the sub-range corresponding to the sub-search region. The processing device 120 may further designate the one or more selected first candidate images as one or more similar images of the at least one similar image to the target image.

In some embodiments, operations 704 to 708 may be performed for each sub-range in parallel, for example, by different processing units of the processing device 120. Alternatively, operations 704 to 708 may be performed for each sub-range in sequence. For example, before 704, the processing device 120 may rank the plurality of sub-ranges to generate a second ranking result. The sub-ranges may ranked according to, for example, the largest similarity degree, the smallest similarity degree, a mid-similarity degree of each sub-range in a descending order or an ascending order. Further, the processing device 120 may sequentially perform operations 704 to 708 for each sub-range according to the second ranking result. Taking a preset similarity range of (60%, 100%) as an instance, the preset similarity range may be evenly divided into forty sub-ranges, i.e., (60%, 61%), (61%, 62%), and (99%, 100%). The forty sub-ranges may be ranked in a descending order according to the largest similarity degree in each sub-range, and be processed sequentially. For example, the processing device 120 may perform operations 704 and 706 for the sub-range (99%, 100%) to determine a first sub-search region corresponding to (99%, 100%), and identify one or more candidate images (denoted as $Set_c$) whose feature vectors are within the first sub-search region. The processing device 120 may also perform operation 708 to determine a similarity degree between the target image and each candidate image in $Set_c$, and select one or more candidate images in $Set_c$ whose similarity degrees to the target image are within (99%, 100%) as one or more similar images corresponding to the sub-range (99%, 100%). In processing the sub-range (99%, 100%), the similarity degree between the target image and each candidate image in Set$_c$ may be determined. If a similarity degree between the target image and a certain candidate image in Set$_c$ is out of the range (99%, 100%), the certain image may be likely to be further processed, for example, when the processing device 120 processes one or more other sub-ranges (e.g., (98%, 99%), (97%, 98%). In the further processing of the certain candidate image, the processing device 120 may not need to determine the similarity degree between the certain candidate image and the target image again, thus increasing the searching rate and efficiency. After the sub-range (99%, 100%) is processed, the processing device 120 may process the other sub-ranges (98%, 99%), (97%, 98%), and (60%, 61%) in sequence in a similarly manner as the sub-range (99%, 100%). In processing another sub-range, such as the sub-range (98%, 99%), the processing device 120 may directly obtain the similar image between the certain candidate image and the target image.

It should be noted that the above description of process 700 is merely provided for the purposes of illustration, and not intended to be understood as the only embodiment. For persons having ordinary skills in the art, various variations and modifications may be conduct under the teaching of some embodiments of the present disclosure. However, those variations and modifications may not depart from the protecting of some embodiments of the present disclosure. In some embodiments, the process 700 may be accomplished with one or more additional operations not described, and/or without one or more of the operations discussed. Additionally, the order of the operations of the process 700 as illustrated in FIG. 7 and described below may not be intended to be limiting.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in smaller than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a numerical range (e.g., a similarity range, a geometrical distance range, and/or a coordinate range) described in the present disclosure is provided for illustration purposes and modified according to different situations. For example, a boundary value of the numerical range may be included or excluded in the numerical range.

What is claimed is:

1. A system for image searching, comprising:
   at least one storage medium including a set of instructions; and
   at least one processor in communication with the at least one storage medium, wherein when executing the instructions, the at least one processor is configured to direct the system to perform operations including:
   obtaining a target image and a plurality of images, wherein at least one similar image to the target image is to be searched from the plurality of images;
   determining a target feature vector of the target image and a feature vector of each of the plurality of images, each of the target feature vector and the feature vectors being an N-dimensional feature vector in an N-dimensional feature space;
   determining, based on the target feature vector and a preset similarity range between the at least one similar image and the target image, a search region in the N-dimensional feature space by:
   dividing the preset similarity range into a plurality of sub-ranges; and
   for each of the plurality of sub-ranges, determining, based on the target feature vector, a sub-search region corresponding to the sub-range in the N-dimensional feature space, and wherein the search region includes plurality of sub-search regions corresponding to the plurality of sub-ranges;
   determining, among the plurality of images, one or more candidate images, the feature vector of each candidate image being within the search region; and
   determining, among the one or more candidate images, the at least one similar image to the target image based on the preset similarity range, the target feature vector, and the one or more feature vectors of the one or more candidate images.

2. The system of claim 1, wherein to determine the at least one similar image to the target image among the one or more candidate images, the at least one processor is further configured to direct the system to perform additional operations including:
   for each of the one or more candidate images, determining a similarity degree between the target image and the candidate image;
   selecting, among the one or more candidate images, at least one candidate image, the similarity degree of each selected candidate image being within the preset similarity range; and
   designating the at least one selected candidate image as the at least one similar image to the target image.

3. The system of claim 2, wherein the at least one similar image includes a plurality of similar images, the at least one processor is further configured to direct the system to perform additional operations including:
   ranking the plurality of similar images according to the similarity degree between each similar image and the target image in a descending order to generate a first ranking result; and
   transmitting, to a terminal device, a display list including at least a portion of the plurality of similar images, wherein at least a portion of the plurality of similar images are ranked according to the first ranking result in the display list.

4. The system of claim 1, wherein the target feature vector includes a target feature value in each dimension in the N-dimensional feature space.

5. The system of claim 4, wherein to determine the search region in the N-dimensional feature space, the at least one processor is further configured to direct the system to perform additional operations including:
   determining a geometrical distance range in the N-dimensional feature space corresponding to the preset similarity range;
   in each dimension, determining a coordinate range of the at least one similar image, a difference between the target feature value in the dimension and each value in the coordinate range being within the geometrical distance range, and
   determining, based on the coordinate range in each dimension, the search region.

6. The system of claim 4, wherein to determine the search region in the N- dimensional feature space, the at least one processor is further configured to direct the system to perform additional operations including:
   determining a geometrical distance range in the N-dimensional feature space corresponding to the preset similarity range, the geometrical distance range being defined by a shortest geometrical distance and a longest geometrical distance;
   in each dimension, determining, based on the shortest geometrical distance and the target feature value in the dimension, a first coordinate range, a difference between the target feature value in the dimension and each value in the first coordinate range being smaller than the shortest geometrical distance;
   in each dimension, determining, based on the longest geometrical distance and the target feature value in the dimension, a second coordinate range, a difference between the target feature value in the dimension and each value in the second coordinate range being smaller than the longest geometrical distance;
   determining a first region defined by the first coordinate ranges in the N-dimensional feature space and a second region defined by the second coordinate ranges in the N-dimensional feature space; and determining a region in the second region excluding the first region as the search region.

7. The system of claim 1, wherein to determine the one or more candidate images among the plurality of images, the at least one processor is further configured to direct the system to perform additional operations including:
for each of the plurality of sub-search regions, determining, among the plurality of images, one or more first candidate images, the feature vector of each first candidate image being within the sub-search region, and wherein the one or more candidate images include the one or more first candidate images corresponding to each sub-search region.

8. The system of claim 1, wherein to determine the at least one similar image to the target image among the one or more candidate images, the at least one processor is further configured to direct the system to perform additional operations including:
for each of the plurality of sub-search regions,
determining or obtaining a similarity degree between the target image and each first candidate image corresponding to the sub-search region;
selecting, among the one or more first candidate images corresponding to the sub-search region, one or more first candidate images, the similar degree between each selected first candidate image and the target image being within the corresponding sub-range; and
designating the one or more selected first candidate images as one or more similar images of the at least one similar image to the target image.

9. The system of claim 1, wherein to determine the sub-search region in the N-dimensional feature space for each of the plurality of sub-ranges, the at least one processor is further configured to direct the system to perform additional operations including:
ranking the plurality of sub-ranges to generate a second ranking result; and
sequentially determining the sub-search region for each of the plurality of sub- ranges according to the second ranking result.

10. The system of claim 1, wherein to determine the one or more candidate images among the plurality of images, the at least one processor is further configured to direct the system to perform additional operations including:
storing the feature vectors of the plurality of images into a table, the table including a plurality of rows and N columns, each row representing an image of the plurality of images, and each column representing a dimension in the N-dimensional feature space;
creating an index for each of the N columns of the table; and
selecting, among the plurality of images, the one or more candidate images based on the search region and the indexes of the table, the feature vector of each candidate image being within the search region.

11. A method for image searching, comprising:
obtaining a target image and a plurality of images, wherein at least one similar image to the target image is to be searched from the plurality of images;
determining a target feature vector of the target image and a feature vector of each of the plurality of images, each of the target feature vector and the feature vectors being an N-dimensional feature vector in an N-dimensional feature space;
determining, based on the target feature vector and a preset similarity range between the at least one similar image and the target image, a search region in the N-dimensional feature space by:
dividing the preset similarity range into a plurality of sub-ranges; and
for each of the plurality of sub-ranges, determining, based on the target feature vector, a sub-search region corresponding to the sub-range in the N-dimensional feature space, and wherein the search region includes plurality of sub-search regions corresponding to the plurality of sub-ranges;
determining, among the plurality of images, one or more candidate images, the feature vector of each candidate image being within the search region; and
determining, among the one or more candidate images, the at least one similar image to the target image based on the preset similarity range, the target feature vector, and the one or more feature vectors of the one or more candidate images.

12. The method of claim 11, wherein the determining the at least one similar image to the target image among the one or more candidate images includes:
for each of the one or more candidate images, determining a similarity degree between the target image and the candidate image;
selecting, among the one or more candidate images, at least one candidate image, the similarity degree of each selected candidate image being within the preset similarity range; and
designating the at least one selected candidate image as the at least one similar image to the target image.

13. The method of claim 12, wherein the at least one similar image includes a plurality of similar images, the method further comprising:
ranking the plurality of similar images according to the similarity degree between each similar image and the target image in a descending order to generate a first ranking result; and
transmitting, to a terminal device, a display list including at least a portion of the plurality of similar images, wherein at least a portion of the plurality of similar images are ranked according to the first ranking result in the display list.

14. The method of claim 11, wherein the target feature vector includes a target feature value in each dimension in the N-dimensional feature space.

15. The method of claim 14, wherein the determining the search region in the N-dimensional feature space includes:
determining a geometrical distance range in the N-dimensional feature space corresponding to the preset similarity range;
in each dimension, determining a coordinate range of the at least one similar image, a difference between the target feature value in the dimension and each value in the coordinate range being within the geometrical distance range, and
determining, based on the coordinate range in each dimension, the search region.

16. The method of claim 14, wherein the determining the search region in the N-dimensional feature space includes:
determining a geometrical distance range in the N-dimensional feature space corresponding to the preset similarity range, the geometrical distance range being defined by a shortest geometrical distance and a longest geometrical distance;
in each dimension, determining, based on the shortest geometrical distance and the target feature value in the dimension, a first coordinate range, a difference between the target feature value in the dimension and each value in the first coordinate range being equal to or smaller than the shortest geometrical distance;

in each dimension, determining, based on the longest geometrical distance and the target feature value in the dimension, a second coordinate range, a difference between the target feature value in the dimension and each value in the second coordinate range being equal to or smaller than the longest geometrical distance;

determining a first region defined by the first coordinate ranges in the N-dimensional feature space and a second region defined by the second coordinate ranges in the N-dimensional feature space; and determining a region in the second region excluding the first region as the search region.

17. The method of claim 11, wherein the determining the one or more candidate images among the plurality of images includes:

for each of the plurality of sub-search regions, determining, among the plurality of images, one or more first candidate images, the feature vector of each first candidate image being within the sub-search region, and wherein the one or more candidate images include the one or more first candidate images corresponding to each sub-search region.

18. A non-transitory computer readable medium, comprising at least one set of instructions for image searching, wherein when executed by at least one processor of a system, the at least one set of instructions directs the system to:

obtain a target image and a plurality of images, wherein at least one similar image to the target image is to be searched from the plurality of images;

determine a target feature vector of the target image and a feature vector of each of the plurality of images, each of the target feature vector and the feature vectors being an N-dimensional feature vector in an N-dimensional feature space;

determine, based on the target feature vector and a preset similarity range between the at least one similar image and the target image, a search region in the N-dimensional feature space by:

dividing the preset similarity range into a plurality of sub-ranges; and for each of the plurality of sub-ranges, determining, based on the target feature vector, a sub-search region corresponding to the sub-range in the N-dimensional feature space, and wherein the search region includes plurality of sub-search regions corresponding to the plurality of sub-ranges;

determine, among the plurality of images, one or more candidate images, the feature vector of each candidate image being within the search region; and determine, among the one or more candidate images, the at least one similar image to the target image based on the preset similarity range, the target feature vector, and the one or more feature vectors of the one or more candidate images.

* * * * *